(12) United States Patent
Jalla

(10) Patent No.: US 11,748,526 B2
(45) Date of Patent: Sep. 5, 2023

(54) METHOD AND SYSTEM FOR STRENGTHENING AND REINFORCING A BUILDING FRAME

(71) Applicant: Consulting Engineers, Corp., Reston, VA (US)

(72) Inventor: Maharaj Jalla, Great Falls, VA (US)

(*) Notice: Subject to any disclaimer, the term of this patent is extended or adjusted under 35 U.S.C. 154(b) by 213 days.

(21) Appl. No.: 16/835,618

(22) Filed: Mar. 31, 2020

(65) Prior Publication Data
US 2021/0303747 A1    Sep. 30, 2021

(51) Int. Cl.
*G06F 30/13*    (2020.01)
*G06F 111/02*   (2020.01)

(52) U.S. Cl.
CPC .......... *G06F 30/13* (2020.01); *G06F 2111/02* (2020.01)

(58) Field of Classification Search
CPC .............................. G06F 30/13; G06F 2111/02
See application file for complete search history.

(56) References Cited

U.S. PATENT DOCUMENTS 7,856,342 B1 * 12/2010 Kfouri ................... G06F 30/00
  703/1
2004/0118069 A1 * 6/2004 Budge ................... E04B 2/8652
  52/582.1
2010/0274374 A1 * 10/2010 Konstantinidis ........ G06F 30/13
  700/98

OTHER PUBLICATIONS

Zhiping Kuang et al., "Computational and Experimental Mechanical Modelling of a Composite Grouted Splice Sleeve Connector System," Materials 2018, 11, 306, pp. 1-12 (Year: 2018).*

* cited by examiner

*Primary Examiner* — Steven W Crabb
(74) *Attorney, Agent, or Firm* — Andrew Morabito

(57) ABSTRACT

A method to reinforce a structural frame, the method comprising: receiving a model of a building, wherein the model is comprised of a frame and the frame is comprised of a series of assemblies which are connected and each of the series of assemblies are comprised of a set of members; processing the frame to a predetermined stress model, wherein a set of alterations to the frame are identified; identifying sections of the frame to be altered based on the determined alterations, wherein the alterations are reinforcements to produce a frame which is able to pass the stress model analysis; modifying the sections of the frame; generating a set of casts based on each section of the frame to be reinforced, and manipulating the frame with the set of casts; and producing a set of instructions and visual depictions of the reinforcement of the sections of the frame.

17 Claims, 11 Drawing Sheets

METHOD AND SYSTEM FOR STRENGTHENING AND REINFORCING A BUILDING FRAME

BACKGROUND

This disclosure relates generally to the improvement in the performance of a building, and more specifically to a method, for strengthening of selective joints in a structure to improve the overall strength of the building.

In many regions of the world hurricanes are a serious problem. The wind speeds increase compared to the regular wind speed and can cause serious damage to buildings and homes. The wind pressure is calculated based on the wind speed; however, the wind pressure increases exponentially compared to the wind speed.

For wind speed of seventy (70) miles per hour, the wind pressure is 12.5 pounds per square feet. For an increase in wind speed two (2) times which is one hundred and forty (140) miles per hour, the wind pressure is 50 pounds per square feet which is four (4) times the wind pressure of 12.5 pounds per square feet. When the wind speed increases Three (3) times which is two hundred and ten (210) miles per hour the wind pressure is 112 pounds per square feet which means the wind pressure increases nine (9) times from 12.5 pounds per square feet.

In hurricane prone areas as the wind pressure increases exponentially with increasing wind speed, the performance of the building needs to increase exponentially to withstand the increased wind pressure. The performance of the buildings is a critical aspect of the safety of the people. The construction material and the construction process of the building dictate the performance of the building during the event of Hurricane.

Cold-formed steel material is a popular material for building construction currently. The cold-formed steel buildings are pre-engineered, pre-manufactured in a factory-controlled environment. The construction time required is much lesser as compared to other conventional construction methods. Workers required on construction sites are also much lesser on cold-formed steel buildings as compared to conventional construction methods. As the cold-formed steel material is pre-manufactured to the least tolerance limit the wastage on site is also very less as compared to the conventional construction methods.

In normal areas (where hurricanes are not prominent), the performance of the cold-formed steel buildings is excellent as compared to the conventional buildings for cost of construction, speed of construction, load-carrying capacity, aesthetic appearance.

In hurricane prone areas, cold-formed steel building's performance is not the best because the wind pressure applied to the building increases exponentially. However, the joints of the cold-formed steel buildings are designed as pin-jointed connections. The capacity of the pin-jointed connection is less as compared to the rigid connections.

To solve the problem of the performance of the cold-formed steel buildings in hurricane-prone regions, the present invention of strengthening of selective connections of cold-formed steel structures will be helpful.

In cold-formed steel construction, the walls are constructed using the vertical studs and horizontal track members. Roof trusses and floor trusses are constructed using the top track, bottom track, and web members. In the present invention of strengthening of selective connections of the cold-formed steel structures, the unique feature of strengthening of the joints of cold-formed steel buildings by pouring the concrete inside the cavity of the walls, roof trusses, floor trusses, joints of a wall to roof truss, joint of a wall to floor truss.

The joint of the roof truss to a wall is the critical junction where different types of forces are applied at the joint. Downward force due to the dead load and live load on the roof truss is applied at the joint of roof truss to a wall. Upward force due to the upward wind pressure is applied at the joint of the roof truss to a wall. Horizontal load due to wind pressure is applied at the joint of roof truss to a wall.

The standard connection between the roof truss to a wall is screw connections with or without some proprietary connections. The capacity of screw connections or proprietary connections is safe to withstand forces from normal wind pressures, however, in hurricane areas the connections are not safe to withstand the wind pressure.

In the present invention, the joint of roof truss to a wall is covered using the sheathing board and concrete is poured inside the cavity between the cold-formed steel members of roof trusses, walls such a rigid connection is formed between the roof truss to a wall junction. The capacity of the roof truss to a wall connection has increased exponentially to withstand various forces due to the wind pressure due to hurricane.

Similar strengthening of the connections of floor truss to a wall junction, floor truss to floor truss connection, wall to wall connection is done by pouring concrete at the joint to provide the rigidity to the connection.

SUMMARY

In a first embodiment, the present invention is a method to reinforce a structural frame, the method comprising: receiving, by at least one processor, a model of a building, wherein the model is comprised of a frame and the frame is comprised of a series of assemblies which are connected and each of the series of assemblies are comprised of a set of members; processing, by at least one processor, the frame to a predetermined stress model, wherein a set of alterations to the frame are identified; identifying, by at least one processor, sections of the frame to be altered based on the determined alterations, wherein the alterations are reinforcements to produce a frame which is able to pass the stress model analysis; modifying, by at least one processor, the sections of the frame; generating, by at least one processor, a set of casts based on each section of the frame to be reinforced, and manipulating the frame with the set of casts; and producing, by at least one processor, a set of instructions and visual depictions of the reinforcement of the sections of the frame.

In a second embodiment, the present invention is a computer program product to reinforce a structural frame, the method comprising: one or more computer non-transitory readable storage media and program instructions stored on the one or more computer non-transitory readable storage media, the program instructions comprising: program instructions to receive a model of a building, wherein the model is comprised of a frame and the frame is comprised of a series of assemblies which are connected and each of the series of assemblies are comprised of a set of members; program instructions to process the frame to a predetermined stress model, wherein a set of alterations to the frame are identified; program instructions to identify sections of the frame to be altered based on the determined alterations, wherein the alterations are reinforcements to produce a frame which is able to pass the stress model analysis; program instructions to modify the sections of the frame; program instructions to generating a set of casts based on each section of the frame to be reinforced, and manipulating the frame with the set of casts; and program instructions to produce a set of instructions and visual depictions of the reinforcement of the sections of the frame.

In a third embodiment, the present invention is a system to reinforce a structural frame, the method comprising: one or more computer processors, one or more computer non-transitory readable storage media, and program instructions stored on the one or more computer non-transitory readable storage media for execution by, at least one of the one or more processors, the program instructions comprising: receiving a model of a building, wherein the model is comprised of a frame and the frame is comprised of a series of assemblies which are connected and each of the series of assemblies are comprised of a set of members; processing the frame to a predetermined stress model, wherein a set of alterations to the frame are identified; identifying sections of the frame to be altered based on the determined alterations, wherein the alterations are reinforcements to produce a frame which is able to pass the stress model analysis; modifying the sections of the frame; generating a set of casts based on each section of the frame to be reinforced, and manipulating the frame with the set of casts; and producing a set of instructions and visual depictions of the reinforcement of the sections of the frame.

BRIEF DESCRIPTION OF THE DRAWINGS

Referring now to the drawings in which like reference numbers represent corresponding parts throughout.

DETAILED DESCRIPTION

Figure 1:
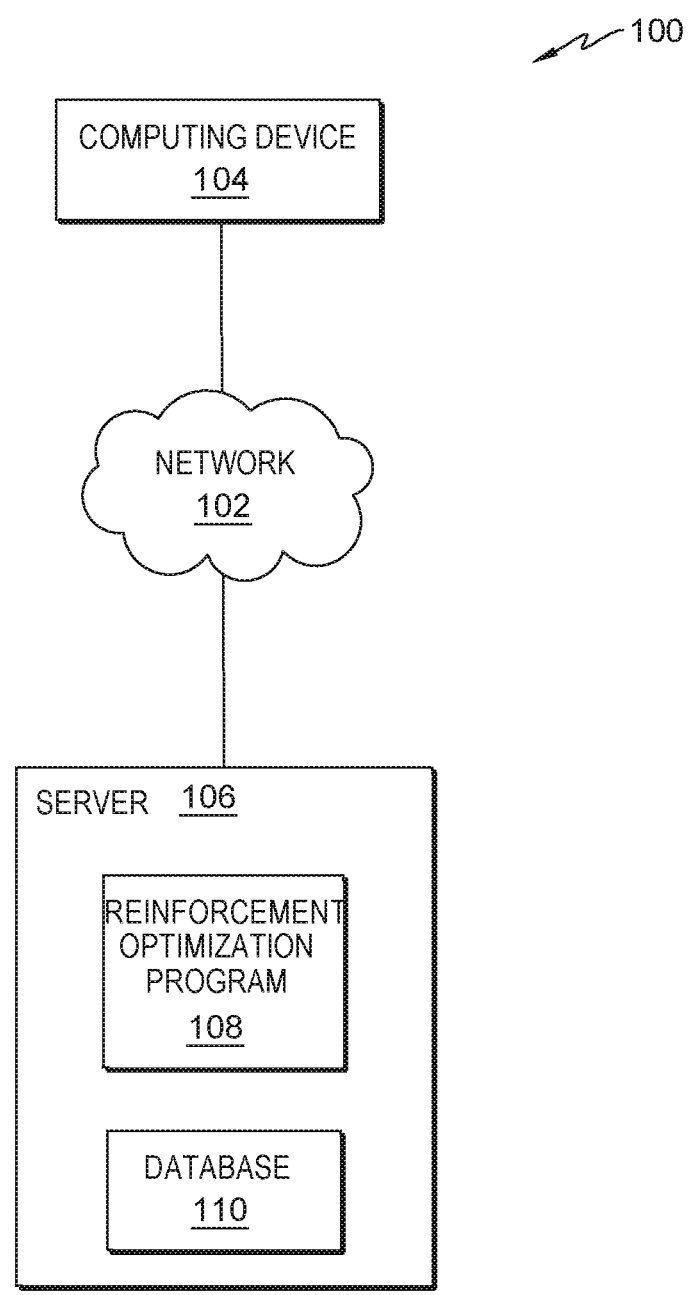
FIG. 1 depicts a block diagram depicting a computing environment, in accordance with one embodiment of the present invention.

This present invention generally relates to the system, method, and process of improving the design and strength of a structure through a process of identifying specific areas of the building frame and reinforcing these areas. Through a process of identifying various joints (e.g. interfaces, intersections, connections, etc.) and members of a frame, the present invention analyzes these identified areas, determines the reinforcement process, and the affect the reinforcement has on the overall strength of the frame, and additional changes which would need to be made to other frame members, and the alterations to the construction of the building (e.g. Bill of Materials (BOM), cost, time, etc. This is especially advantageous in areas that are prone to high winds or hurricanes, the structural integrity of their buildings and home is vital for the safety of the occupants, and those around if debris is spread.

The present invention novelizes the process of designing a building using a specialized approach for the strengthening of selective joints. Designing the building for wind speeds ranging from 180 mph to 400 mph, within an objective to keep costs and additional materials at a minimum. Redesigning the building using a combination of frame materials, and a reinforcement compound. This compound can be concrete or the like known to one skilled in the art.

The present invention is able to integrate various building codes, for example, but not limited to: Florida Building Code (2017), International Building Code (IBC) 2015, ASCE 7-16—American Society of civil Engineers (Minimum Design loads for buildings & other structures), AISC 360-10—American Institute of steel construction (Specification for structural steel buildings), AISI—2007—American Iron and Steel Institute (Design of Cold Formed steel & structural members), ACI 318-11—American Concrete Institute (Building code requirements for structural concrete), ASTM American Society for Testing and materials, AISI LRFD CFS design standard, and other local, state, federal, and national building codes to confirm that the building design is compliant with all codes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
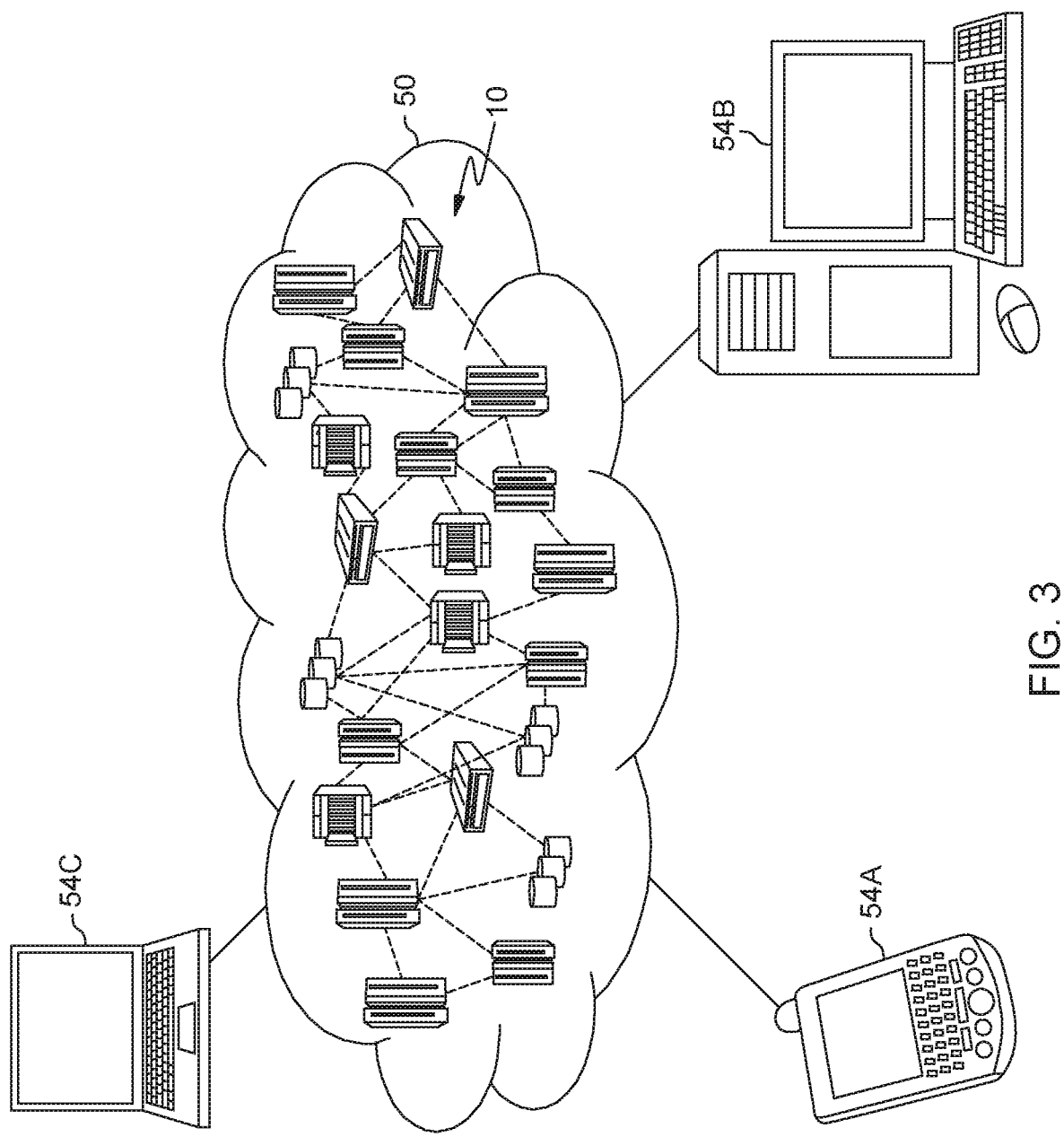
FIG. 3 depicts a cloud computing environment, in accordance with one embodiment of the present invention.

FIG. 3 depicts a block diagram of a computing environment 100 in accordance with one embodiment of the present invention. FIG. 1 provides an illustration of one embodiment and does not imply any limitations regarding the environment in which different embodiments maybe implemented. In the depicted embodiment, computing environment 100 includes network 102, computing device 104, and server 106. Computing environment 100 may include additional servers, computers, or other devices not shown.

Network 102 may be a local area network (LAN), a wide area network (WAN) such as the Internet, any combination thereof, or any combination of connections and protocols that can support communications between computing device 104 and server 106 in accordance with embodiments of the invention. Network 102 may include wired, wireless, or fiber optic connections.

Computing device 104 may be a management server, a web server, or any other electronic device or computing system capable of processing program instructions and receiving and sending data. In other embodiments, computing device 104 may be a laptop computer, tablet computer, net book computer, personal computer (PC), a desktop computer, or any programmable electronic device capable of communicating with patient computing device 104 via network 102. In other embodiments, computing device 104 may be a server computing system utilizing multiple computers as a server system, such as in a cloud computing environment. In one embodiment, computing device 104 represents a computing system utilizing clustered computers and components to act as a single pool of seamless resources. Computing device 104 may include components, as depicted and described in further detail with respect to FIG. 1.

Server 106 may be a management server, a web server, or any other electronic device or computing system capable of processing program instructions and receiving and sending data. In other embodiments server 106 may be a laptop computer, tablet computer, net book computer, personal computer (PC), a desktop computer, or any programmable electronic device capable of communicating via network 102. In one embodiment, server 106 may be a server computing system utilizing multiple computers as a server system, such as in a cloud computing environment. In one embodiment, server 106 represents a computing system utilizing clustered computers and components to act as a single pool of seamless resources. In the depicted embodiment reinforcement optimization program 108 and database 110 are located on server 106. Server 106 may include components, as depicted and described in further detail with respect to FIG. 1.

Reinforcement optimization program 108 has the unique and advantageous features of analyzing a building frame, identifying weak or weaker portions of the frame, and reinforcing these areas based on various minimum requirements for strength. The reinforcement optimization program 108 determines how to strengthen the frame within minimal material and costs. By focusing on key joints and/or members, the reinforcement optimization program 108 is able to determine the ideal amount of reinforcement material to apply to the improve the strength of the specific area of the frame to provide the maximum increase in the structure integrity of the building based on an analyzed worst case scenario (e.g. wind speed and pressure values) the building is likely to encounter.

In some embodiments, the reinforcement optimization program 108 is able to detail the structural design requirement and design specifications of a building with assumptions or standard values to assess the reinforcement improvement values. These assumptions may be, but are not limited to; the following assumption; the minimum ultimate compressive strength of concrete used for footing and slab will be 4000 psi with normal weight structural concrete of 145 pcf, the minimum ultimate compressive strength of concrete used for foam concrete to be filled inside the wall cavity will be 5000 psi with Light weight structural concrete of 50 pcf, allowable Soil bearing capacity is 2500 psi for the foundation design, the reinforcement used shall confirm to ASTM A615 of Grade 60 ksi, sizes of structural openings are assumed to be the same as the openings in the architectural drawings with tolerance of ¼" on all sides, foundation will be checked for 1500 psf bearing, the structure will be supported on concrete trench footing designed on suitable soil for a net allowable soil bearing pressure with well compacted fill, 4" thick concrete slab is rested on exterior concrete trench footing, the foundation design will be in accordance of ACI 318-2011, basic wind speed, terrain categories, topography factors, design wind pressure values, seismic loads, live loads (e.g. building weight), dead loads (ceiling, exterior walls, roof, interior wall), material properties (e.g. cold formed steel grade, concrete types and grades), and the like.

In the depicted embodiment, Reinforcement optimization program 108 utilizes network 102 to access the computing device 104 and to communicate with database 110. In one embodiment, Reinforcement optimization program 108 resides on computing device 104. In other embodiments, Reinforcement optimization program 108 may be located on another server or computing device, provided Reinforcement optimization program 108 has access to database 110.

Database 110 may be a repository that may be written to and/or read by Reinforcement optimization program 108. Information gathered from computing device 104 and the 1D, 2D, and 3D drawings and models as well as the requirements so that the materials and members are identified as conflicting or non-conflicting. In one embodiment, database 110 is a database management system (DBMS) used to allow the definition, creation, querying, update, and administration of a database(s). In the depicted embodiment, database 110 resides on computing device 104. In other embodiments, database 110 resides on another server, or another computing device, provided that database 110 is accessible to Reinforcement optimization program 108.

Figure 2:
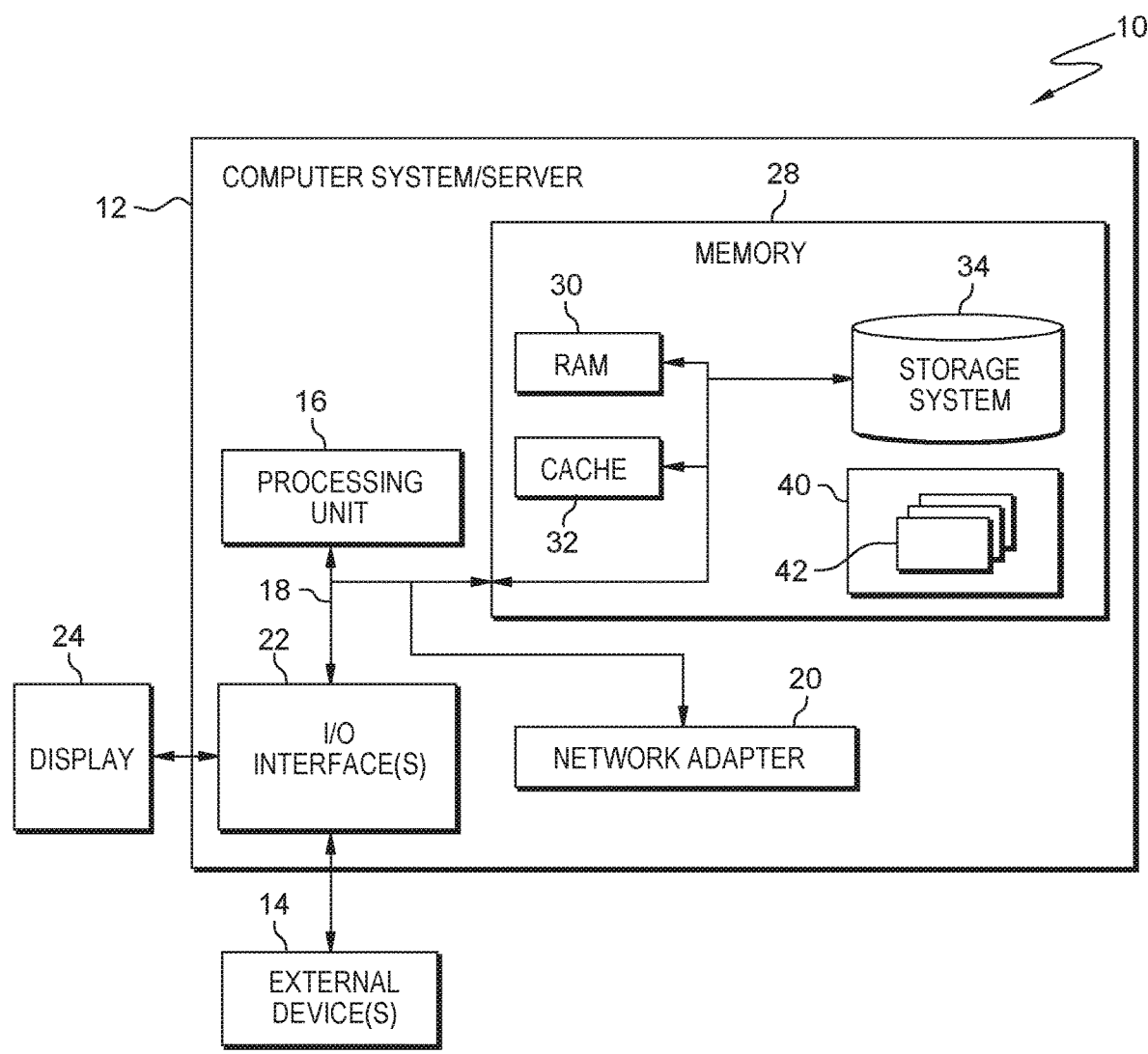
FIG. 2 depicts a block diagram depicting the internal and external components of the server and computing device of FIG. 1, in accordance with one embodiment of the present.

FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing environment 10 there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

FIG. 2, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 2 are intended to be illustrative only and that computing nodes 10 and cloud computing environment 50 can communicate with any type of computerized device over any type of network and/or network addressable connection (e.g., using a web browser).

Referring back to FIG. 2, the Program/utility 40 may include one or more program modules 42 that generally carry out the functions and/or methodologies of embodiments of the invention as described herein. Specifically, the program modules 42 analyze a building model, identify vital areas of the building model to reinforce, and determine the properties of the reinforcement based on the desired results. Other functionalities of the program modules 42 are described further herein such that the program modules 42 are not limited to the functions described above. Moreover, it is noted that some of the modules 42 can be implemented within the infrastructure shown in FIGS. 1-3.

Figure 4:
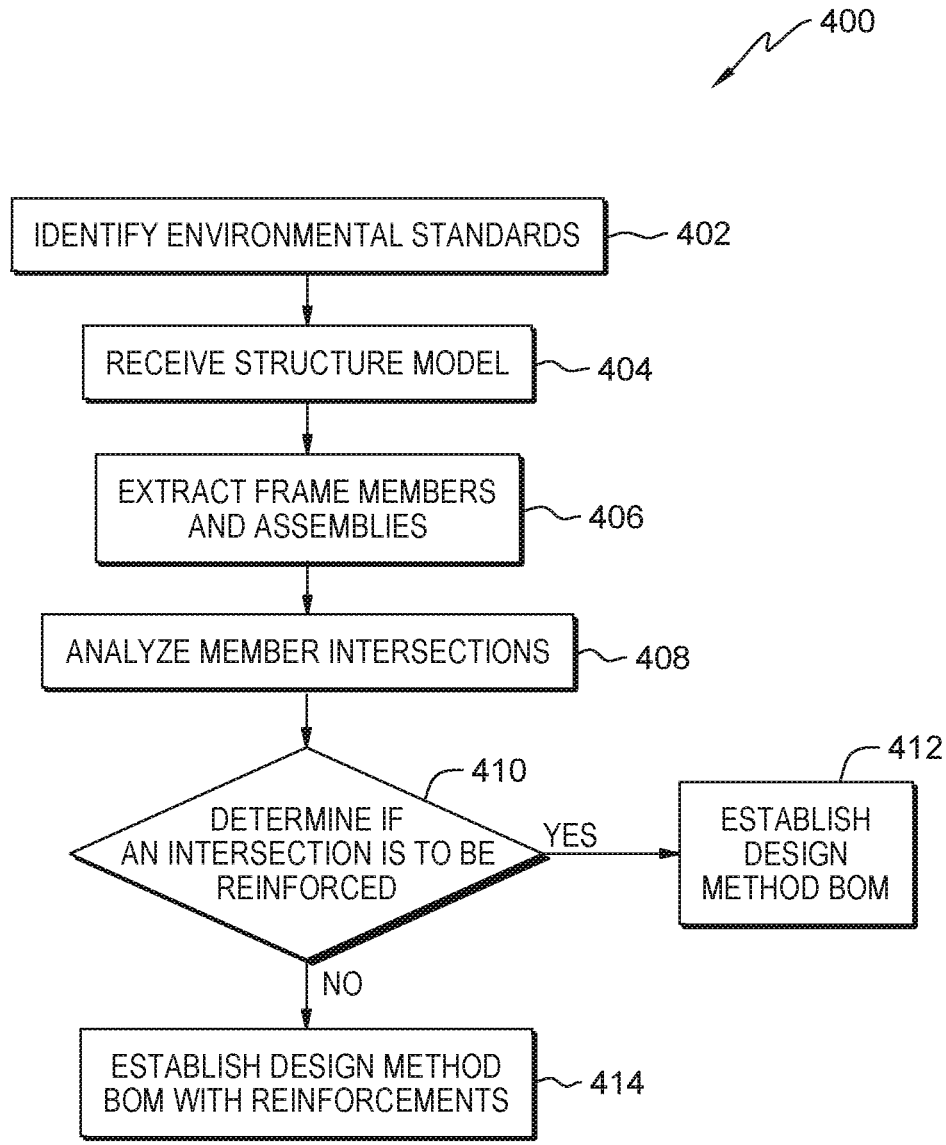
FIG. 4 depicts a flowchart of the operational steps of a method for determining the directional conflict checks for joists in building within the computing environment of FIG. 1, in accordance with one embodiment of the present invention.

FIG. 4 depicts a flowchart 400 of the operational steps of a method for identifying conflicts for wall member in building within the computing environment of FIG. 1, in accordance with one embodiment of the present invention. The method(s) and associated process(es) are now discussed, over the course of the following paragraphs, in accordance with one embodiment of the present invention.

The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

In step 402, the reinforcement optimization program 108 establishes the environmental standards for the calculations. These standards are used to set forth the limitations from which the reinforcement optimization program 108 is able to work within. These relate to the standards and assumptions about the building and the forces acting on the building in the analysis. In addition to the standards and assumptions listed above, additional examples of standards may be, but not limited to: load bearing wall members; these members are provided at the load-bearing walls and shall be designed as compression members by 'elastic theory of design'. These members are of light gauge structural steel filled with foam concrete inside the cavity of wall. These walls are designed for self-weight of wall, dead load of sheathing supported on the wall, out of plane wind pressure. The point load from the bearing wall member of floor is transferred to the trench footing below. Non-load bearing wall members; these members are provided at the non-load-bearing wall and shall be designed as a compression member by 'elastic theory of design'. These members shall be designed for self-weight of wall and for a minimum wind load of 5 psf. In some embodiments, these members cold formed steel which are made from light gage structural steel. Headers: headers are placed over the openings and it is subjected to the dead load of wall & roof on top of it and wind load of wall panel and roof live load. Headers are checked in bending, shear and deflection. For headers in the bearing walls, steel sections are used which are designed for bending, shear & deflection. Design of roof and floor framing; the structural elements found in roof and roof framing are designed such that the members take the load coming onto them safely. Roof framing must transfer its load to wall below and floor framing must transfer load to footing below. Foundation design: the structure will be supported on concrete trench footing resting on suitable soil for a net allowable soil bearing pressure with well-compacted fill. Screw specification; and deflection criteria for walls with brittle finishes: total load=$1/240$, and walls with flexible finishes: live load=$1/120$. Roof slope slope of roof joist will be $5/12$ in addition to other standards and assumptions.

In step 404, the reinforcement optimization program 108 analyzes the frame of the building. The frame is comprised of the members and assemblies and the connections or intersections between these members and assemblies. These assemblies can be wall panels, roof trusses, floor joists, and the like. In some embodiments, the sheathing materials and other finishing materials and systems are identifiable within the building model. The reinforcement optimization program 108 is able to extract the connections or joints within frame from the building model. In some embodiments, the reinforcement optimization program 108 is able to perform a conflict check between the members and the frame to determine if the model frame is properly constructed or assembled in the virtual space.

Figure 5:
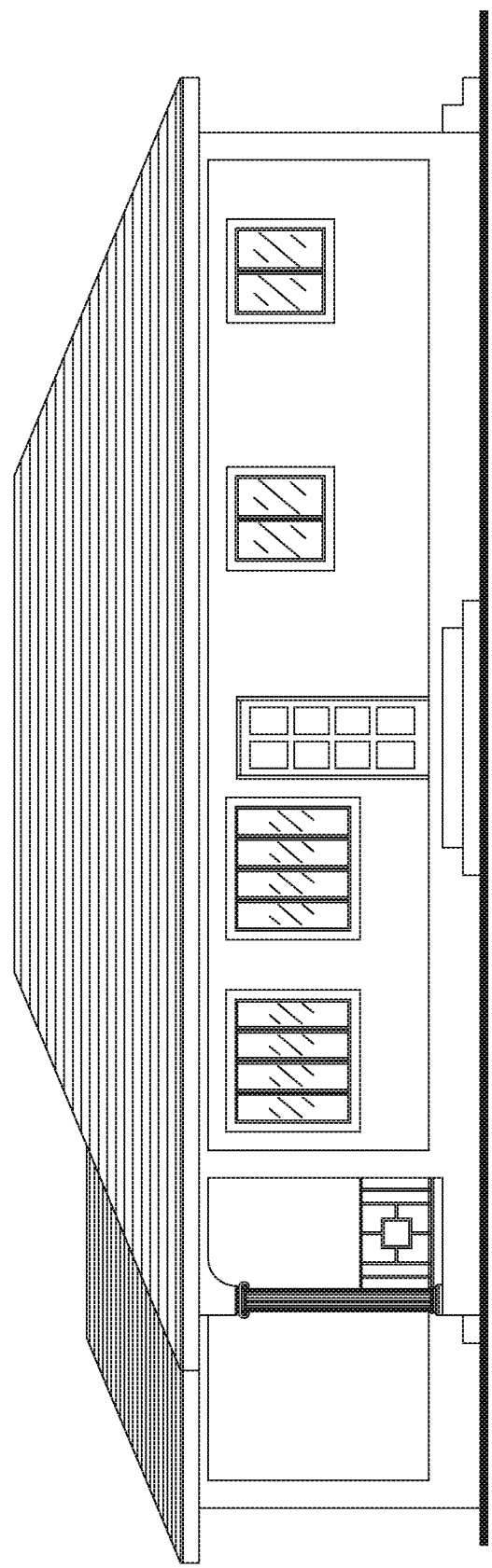
FIG. 5 depict an illustration of a building, in accordance with one embodiment of the present invention.
Figure 6:
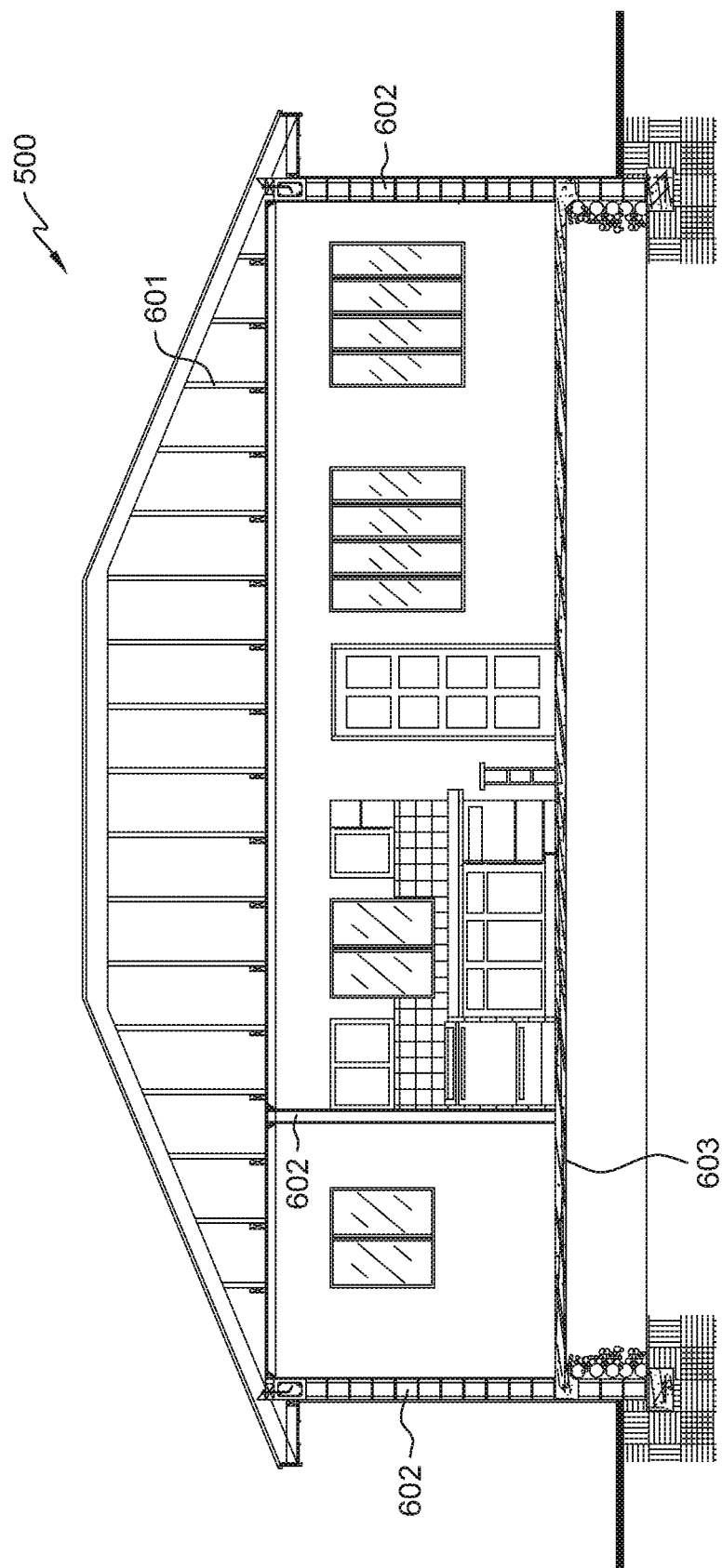
FIG. 6 depicts an illustration of a cross section of the building, in accordance with one embodiment of the present invention.

Depicted in FIGS. 5 and 6 are images of a building 500, wherein the exterior and finishing of the building are shown. This depicted the final state of the building and in some embodiments sets forth the limitations as to the alterations which can be made to the frame. The exterior features such as windows and doors are identified in the apertures in the frame. FIG. 6 depicts a cutaway of the building 500, wherein a portion of the frame is shown as well as interior and exterior features of the building. In the depicted embodiment, the roof trusses 601, wall assemblies 602, and the floor assembly 603 are shown. The foundation is identified and is not excluded from the reinforcement optimization program 108 analysis.

In step 406, the reinforcement optimization program 108 extracts the frame members and assemblies and analyze the members and the intersections between the members and the assemblies to identify and determine the ideal portions of the frame to reinforcement to provide the desired increase in structural strength. The reinforcement optimization program 108 performs an analysis on the frame to first determine the intersections base strength within the set parameters (e.g. wind speed, forces, pressure differentials, etc.). This analysis is performed on each intersection to generate a list of each intersections and its strength on the set parameters.

In some embodiments, the reinforcement optimization program 108 calculates the member or intersection requirements based on the model analysis parameters. This may result in further modifications of the members profiles, lengths, and properties. The reinforcement optimization program 108 calculates the preliminary cost of construction. The reinforcement optimization program 108 calculates the merits of the specialized approach compared to the regular design method based on following parameters, wherein the cost of construction, feasibility of construction, constructability of the frame, and performance of the frame.

Figure 7:
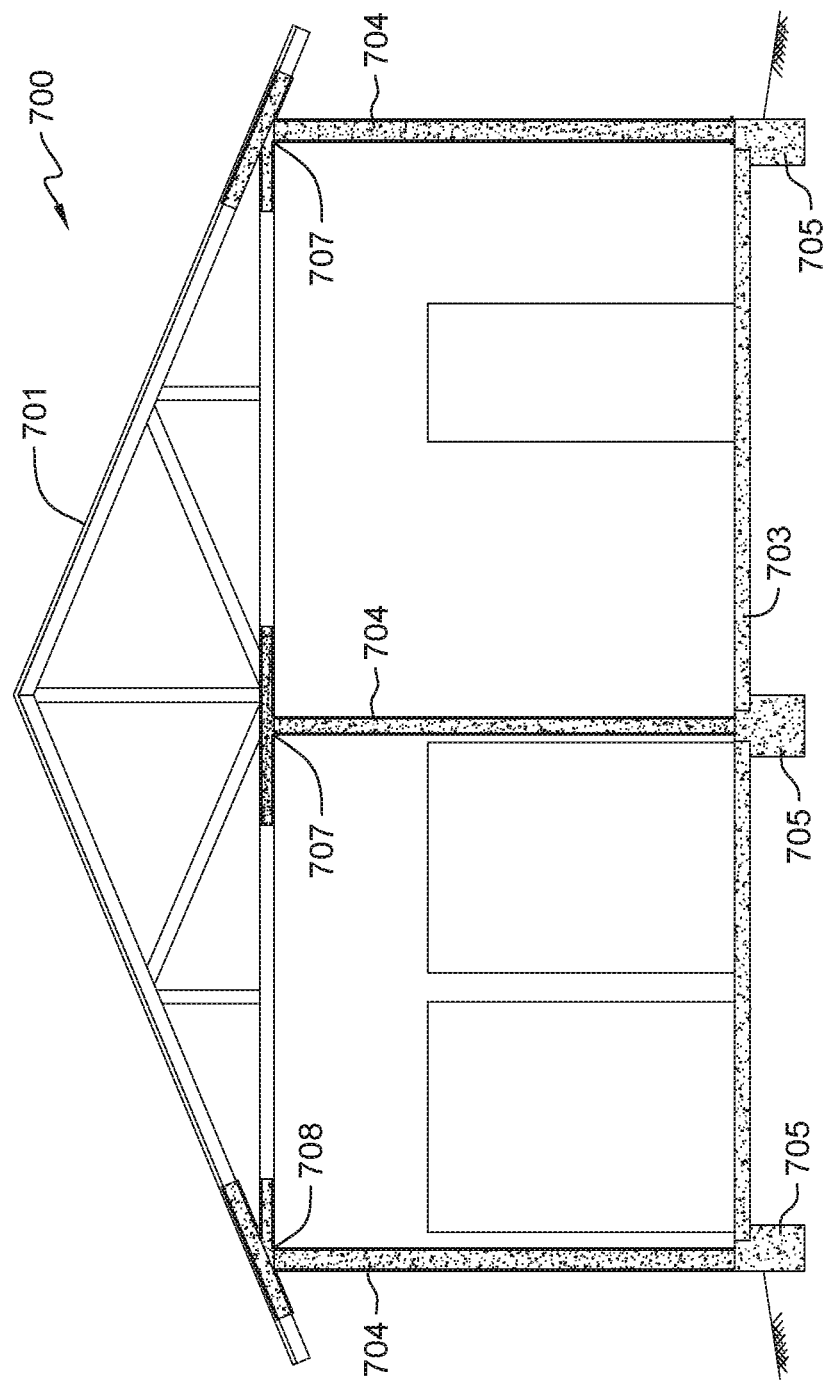
FIG. 7 depicts an illustration of a selection of frame members and intersections of a building, in accordance with one embodiment of the present invention.

In step 408, the reinforcement optimization program 108 determines which members and/or intersections to reinforce and the requirements to complete the reinforcement. When a member or intersection is identified to be reinforced. That member or intersection is analyzed to determine the reinforcement process, this includes that amount of material to be applied to the member, intersection or assembly, the necessary braces to properly contain the identified member, frame, or assembly which the material is to be applied to, the reinforcement procedures, and to generated an updated model showing the reinforcements. For example, as shown in FIG. 7, the frame assembly 700 has been reinforced in sections 702, 703, and 704 identified in the sections of the frame with the markings as opposed for the sections of the frame 701 which are shown as unaltered. In the depicted embodiment, the foundation 705 is reinforced to handle the additional weight of the reinforced members, assemblies, and intersections. The reinforcement optimization program 108 determines in its analysis and determine the stopping or termination of the reinforcement of the frame members. As shown in the depicted embodiment, shown in intersections 707, 708, and 709 the reinforcement stops at predetermined distances from the center of the intersection. The reinforcement optimization program 108 is able to determine this termination point. The reinforcement optimization program 108 determines the necessary reinforcement ideally limiting the amount of reinforcement based on a cost or construction restrictions. With the reinforcement process, the assembly and intersection design may require different procedures or material to be used. For example, reinforcing a wall assembly is handled different than an intersection between a roof joist and wall panel. Machine learning technology may be implemented with the reinforcement optimization program 108 to determine how to produce the desired results of reinforcement with a manufacturing process wherein the reinforcement is able to be completed.

Figure 8A:
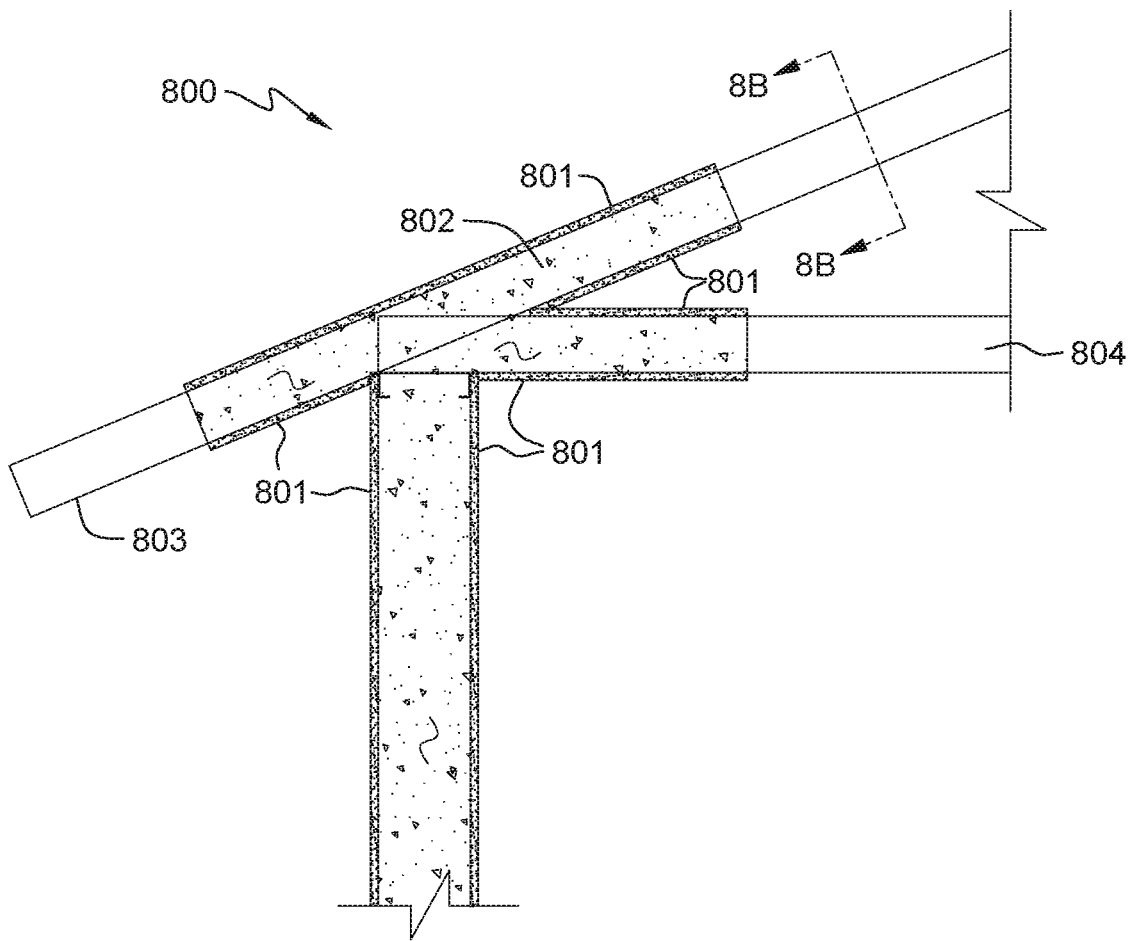
FIG. 8A depicts an illustration of a joint, in accordance with one embodiment of the present invention.
Figure 8B:
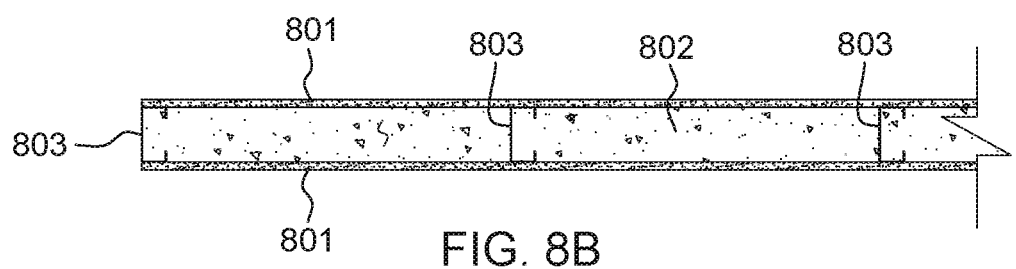
FIG. 8B depicts another illustration of a the, in accordance with one embodiment of the present invention.

In step 410, the reinforcement optimization program 108 generates the procedure to produce the calculates reinforcement of the building frame. Once the reinforcement optimization program 108 identifies the desired reinforcement of the building or a portion of the building and reinforcement optimization program 108 identifies the process and procedures to produce the desired results. As depicted in FIGS. 8A and 8B, a section of a wall panel and roof truss intersection are shown and the intersection of these assembles as well as portions of the members within the intersection which are reinforced as well. Members 803 and 804 of the intersection are shown with portions reinforced and sections without reinforcement. Containment panels 801 are used to provide a cast which the reinforcement material 802 is poured within. In the depicted embodiment, the reinforcement material 802 is a concrete slur. In additional embodiments, various other materials can be used. FIG. 8B shows a cross section of a series of roof truss assemblies where members 803 are exposed, the reinforcement material 802 is poured within the cast 801 across several roof trusses. It is shown that the reinforcement material 802 fills the cavities within the cast 801 including within the internal cavity of the members 803. In the depicted embodiment, the members 803 are contained within the cast 801. The frame model is manipulated to show these reinforced areas and how the interfacing of the members and assemblies is altered within the model. In some embodiments the frame members are constructed in the normal process and the reinforcement material is applied over the fastened frame members. In other embodiments, the members are not fastened together, and the reinforcement material replaces the fasteners.

Figure 9A:
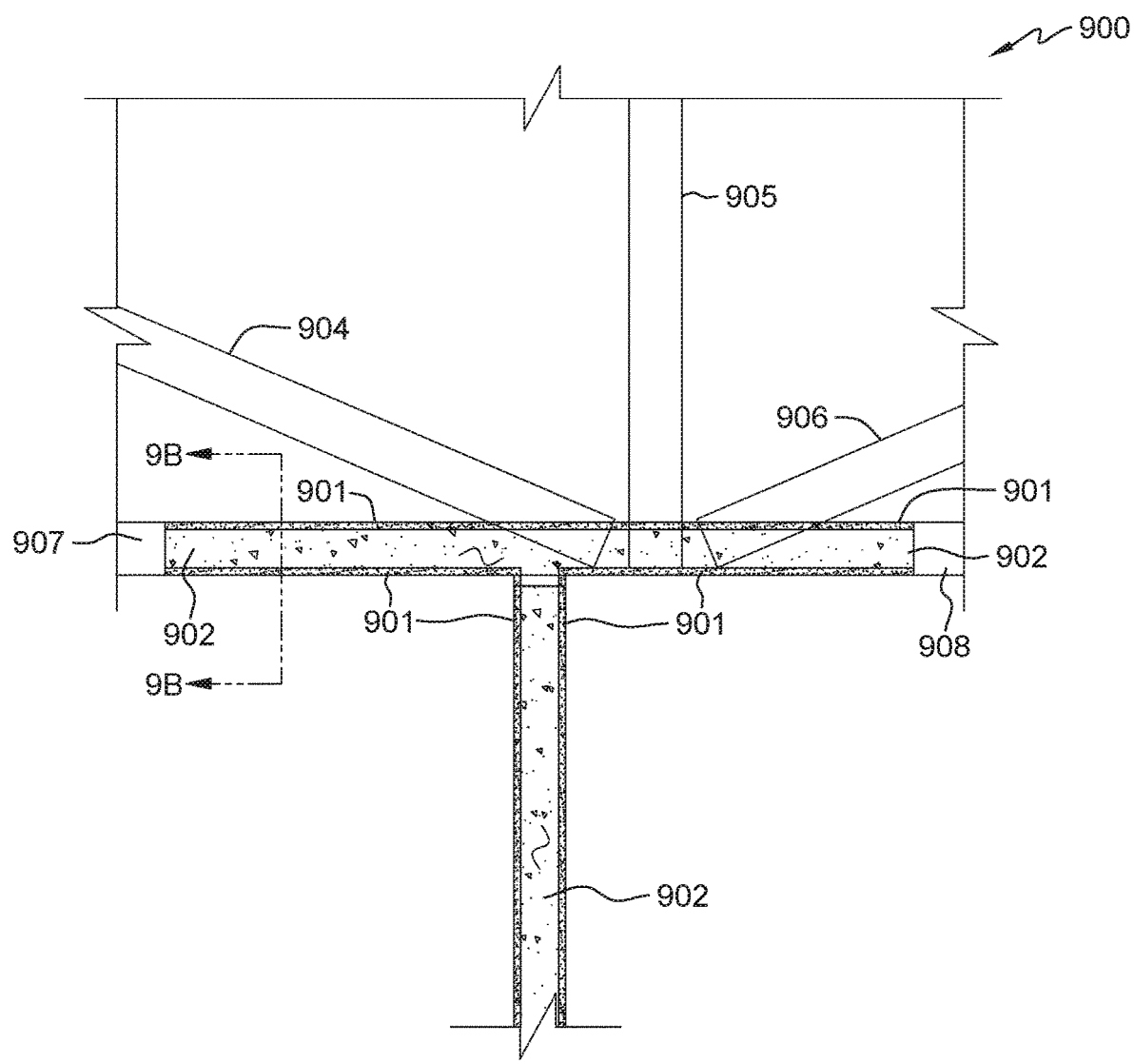
FIG. 9A depicts an illustration of an interface, in accordance with one embodiment of the present invention.
Figure 9B:
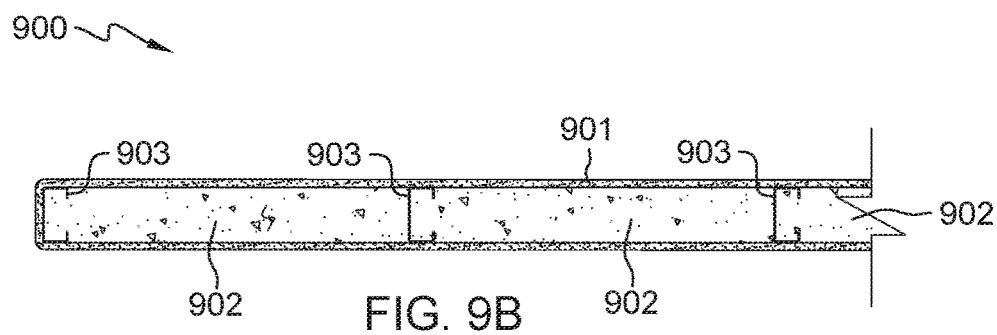
FIG. 9B depicts another illustration of the interface, in accordance with one embodiment of the present invention.

As depicted in FIGS. 9A and 9B is another embodiment of the result of reinforcement on an intersection of a set of members, in accordance with one embodiment of the present invention. In the depicted embodiment a series of members 904, 905, 906, 907, 908, 909 intersect and are reinforced about the intersection. Casts 901 are used to provide a space to insert (pour, or the like based on the consistency of the reinforcement material) the reinforcement material 902. In the depicted embodiment, portions of members 904 and 906 are within the reinforced area but do not require a cast 901. As depicted in FIG. 9B, the cast 901 wraps around the end of the member 903. The reinforcement material substantially fills the space between each of the members 903 to reinforce the entirety of the assembly. In some embodiments, the cast 901 is separated by the members 903, wherein there are multiple sections of reinforcement material 902 to be inserted into.

Figure 10:
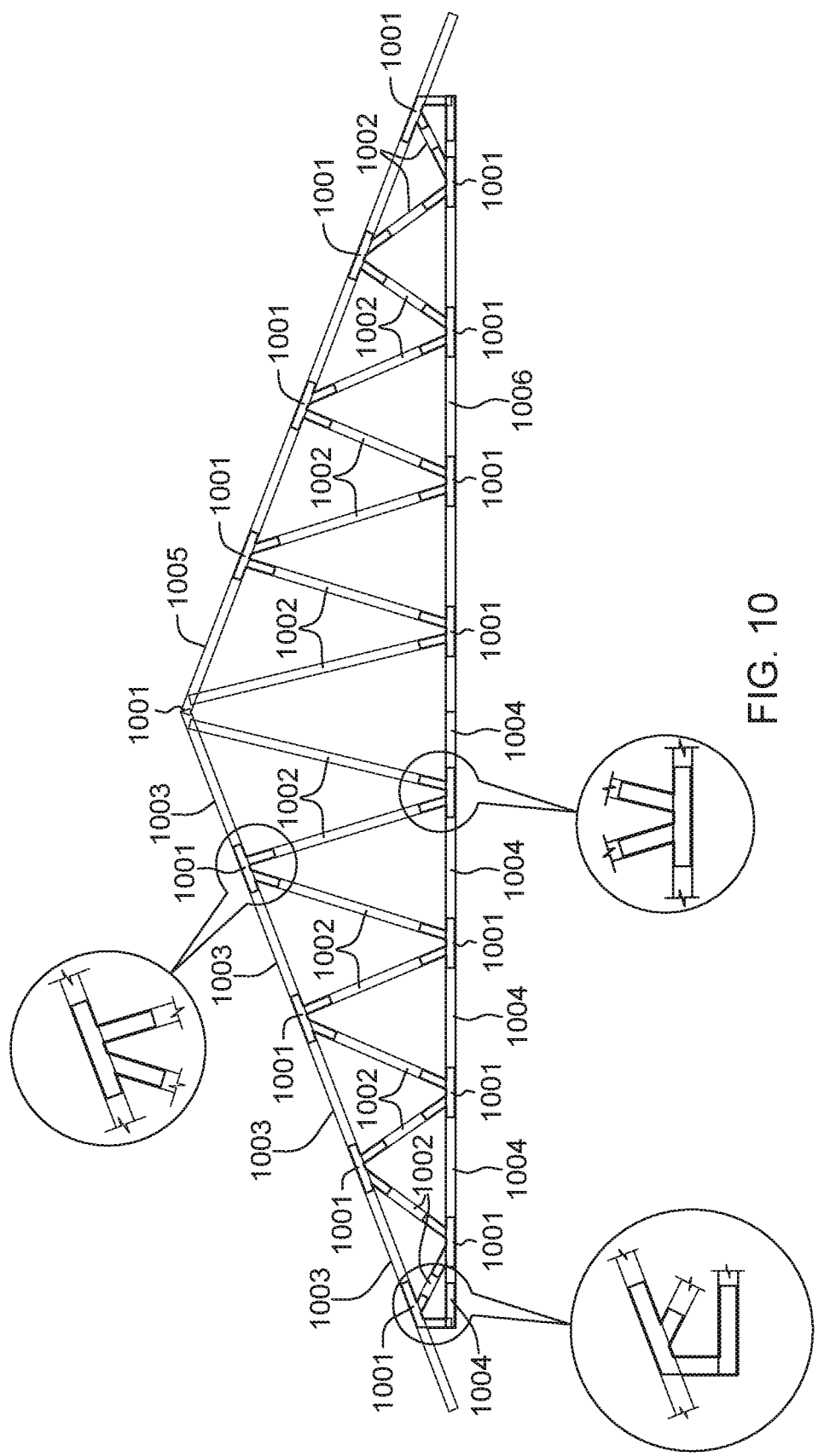
FIG. 10 depicts a roof truss assembly, in accordance with one embodiment of the present invention.
Figure 11:
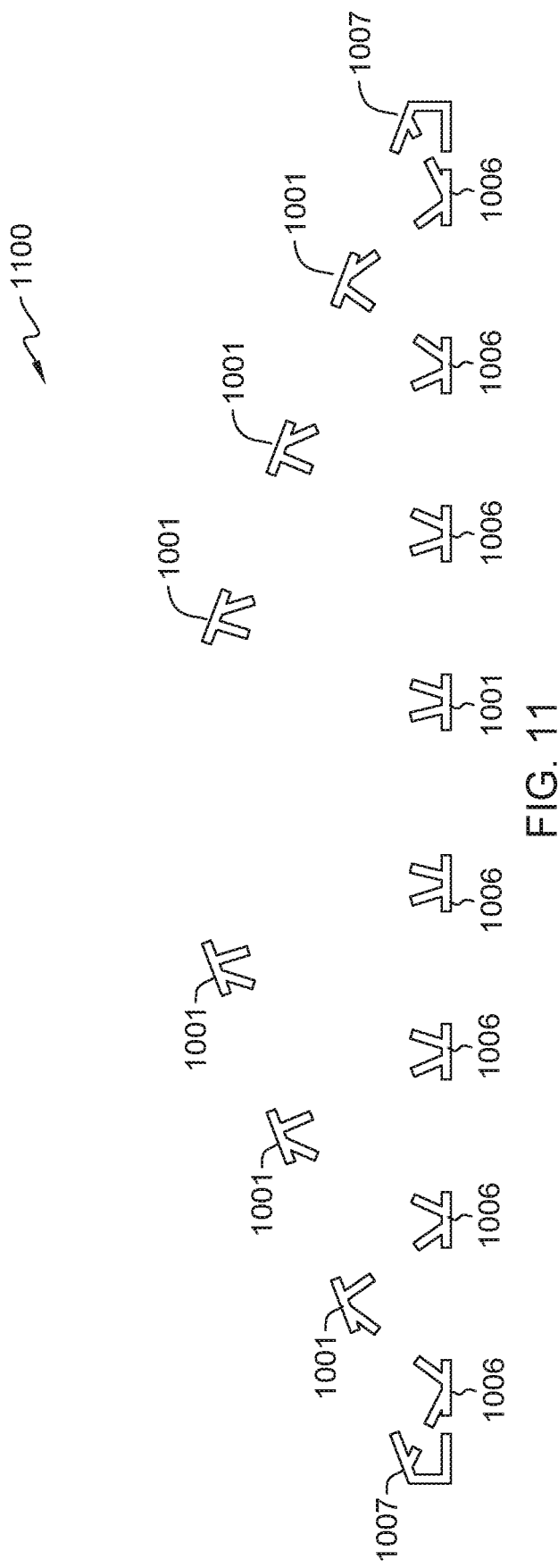
FIG. 11 depicts an isolation of the reinforced joints in the roof truss assembly, in accordance with one embodiment of the present invention.

FIGS. 10 and 11 depicted a roof truss 1000 with a series of reinforced joints 1001, 1006, and 1007, in accordance with one embodiment of the present invention. In the depicted embodiment, the roof truss 1000 is isolated from the frame and the analysis is performed to determine the sections of the roof truss 1000 to be reinforced. Each interface of each member (e.g. 1002, 1005, 1003, 1004, and 1008) is analyzed and the portion or sections of the interfaces and members are reinforced. In the depicted embodiment, the reinforcement material is shown extending along each member of each interface, as shown in the zoomed in images of the various reinforced joints. In additional embodiments, the reinforcement material may only extend or include a portion of the members of the interfaces. In the depicted embodiment, the members 1005 and 1006 extend through multiple reinforced joints 1001 and 1006 respectively, while members 1003 and 1004 are extend from one reinforced joint to the next as individual members. In a variety of situations these different designs can be implemented based on the reinforcement optimization program 108 analysis and determination as to the necessary design based on both strength of the frame and the assembly processes feasibility. The members could extend through two or more joints either reinforced or not depending on the overall design of the assembly and frame as a whole. FIG. 11 depicts an isolation of the reinforced joints. The reinforced joints 1001 extend a predetermined distance from each interface to produce the additional structural strength required to meet the computed strength requirements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalent.

What is claimed is:

1. A method to reinforce a structural frame, the method comprising:
    receiving, by at least one processor, a model of a building, wherein the model is comprised of a frame and the frame is comprised of a series of assemblies which are connected and each of the series of assemblies are comprised of a set of members;
    processing, by the at least one processor, the frame based on a predetermined stress model, wherein weaknesses in the frame are identified;
    generating, by the at least one processors, a set of alterations to the frame based on the weaknesses identified in the frame, the assemblies and the members which are involved in the weaknesses identified in the frame are identified, based on a predetermined strength from the stress model;
    manipulating, by the at least one processor, an identified section of the frame, wherein the identified sections of the frame are to be modified to produce a value greater than the predetermined strength intended from the stress model;
    analyzing, by the at least one processor, the identified sections of the frame which was manipulated to determine the manipulation from an original state and determining a manipulation to a foundation based on the manipulation to the frame; and
    generating, by the at least one processor, a set of casts based on the change from the original state to the manipulated state of each section of the frame to be reinforced, wherein the set of casts are substantially aligned with an outside edge of the set of members and have substantially a similar profile to the set of members in which they are substantially aligned with.

2. The method of claim 1, further comprising, identifying, by the at least one processor, a member which is involved in more than one reinforcement section.

3. The method of claim 2, further comprising, analyzing, by the at least one processor, the member and dividing the member into a series of sections wherein each section interfaces with at least two reinforcement sections.

4. The method of claim 1, wherein the set of casts substantially conceal the set of members.

5. The method of claim 1, further comprising, altering, by the at least one processor, properties of the reinforcement material based on the volume of the reinforcement section.

6. The method of claim 1, further comprising, manipulating, by the at least one processor, an assembly process of one of the series of assemblies based on the calculation of the reinforcement sections.

7. The method of claim 6, further comprising, generating, by the at least one processor, an assembly process of each of the series of assemblies and the frame based the manipulated assembly process of the series of assemblies.

8. A computer program product to reinforce a building structural with a slurry, the method comprising:
    one or more computer non-transitory readable storage media and program instructions stored on the one or more computer non-transitory readable storage media, the program instructions comprising:
    program instructions to analyze a model of a building, wherein the model is comprised of a frame, and the frame is comprised of a set of interconnecting members;
    program instructions to apply a load to the frame, wherein the load is applied to the members and the intersections between the members;
    program instructions to identify the intersections of the interconnecting members which failed due to the applied load, and identifying a type of failure;
    program instructions to manipulate the frame, wherein the manipulations are fortifying the intersections with a construction slurry;
    program instructions to apply a load to the frame with the fortified intersections to determine if the fortified intersections do not fail due to the applied load;
    program instructions to analyze a foundation of the building based on the fortified intersections to determine if the foundation meets a minimum set of requirements based on a new building design;

program instructions to generating a set of casts based on a final design of the fortified intersection, wherein the set of casts are substantially aligned with an outside edge of the intersection of the members which is reinforced and wherein the set of casts have a profile which is substantially similar to that of the members, and are designed to contain the construction slurry; and program instructions to produce a set of instructions and visual depictions of the reinforcement of the sections of the frame, and calculate a quantity of construction slurry based on the cast volume minus the member volume.

9. The computer program product of claim 8, further comprising, program instructions to identify a member which is involved in more than one reinforcement section.

10. The computer program product of claim 9, further comprising, program instructions to analyze the member and dividing the member into a series of sections wherein each section interfaces with at least two reinforcement sections.

11. The computer program product of claim 8, wherein the set of casts substantially conceal the set of members.

12. The computer program product of claim 8, further comprising, program instructions to alter properties of the reinforcement material based on the volume of the reinforcement section.

13. The computer program product of claim 8, further comprising, program instructions to manipulate an assembly process of one of the series of assemblies based on the calculation of the reinforcement sections.

14. The computer program product of claim 13, further comprising, program instructions to generate an assembly process of each of the series of assemblies and the frame based the manipulated assembly process of the series of assemblies.

15. A system to reinforce a c-channel structural frame with a concrete slurry, the method comprising:
one or more computer processors, one or more computer non-transitory readable storage media, and program instructions stored on the one or more computer non-transitory readable storage media for execution by, at least one of the one or more processors, the program instructions comprising:
receiving a model of a building, wherein the model is comprised of a series of interconnecting members;
analyzing the series of interconnecting c-channel members, by applying at least one load, wherein weaknesses in the interconnection of the c-channel members is identified;
identifying interconnections of the c-channel members which failed the load to be altered based on the identified weaknesses;
analyzing the failed interconnections of the c-channel members to determine a design of a concrete reinforcement to the interconnection of the c-channel members, wherein the alterations produce a frame which is able to pass the applied at least one load;
manipulating the identified interconnections of the model based on the design of the concrete reinforcement, wherein the model is manipulated to show the concrete reinforcements;
generating a set of casts based on each reinforcement of the c-channel members, wherein the set of casts are substantially aligned with an outside edge of the set of c-channel members and are sized to contain a volume of the concrete in a slurry state and calculate a quantity of concrete to substantially fill the casts; and
program instructions to generate an assembly process of the frame based on the concrete reinforcements, wherein the assembly process involves the removal of the set of casts.

16. The system of claim 15, further comprising, identifying a member which is involved in more than one reinforcement section.

17. The system of claim 16, further comprising, analyzing the member and dividing the member into a series of sections wherein each section interfaces with at least two reinforcement sections.

\* \* \* \* \*